United States Patent Office 3,751,508
Patented Aug. 7, 1973

3,751,508
CATALYST FOR SELECTIVE HYDROGENATION OF ACETYLENIC HYDROCARBON IN THE CONCURRENT PRESENCE OF DIOLEFIN
Tokuo Fujiso, Yokosuka, and Tadashi Ohmori, Kawasaki, Japan, assignors to Nippon Oil Company, Ltd., Minato-ku, Tokyo, Japan
No Drawing. Filed Feb. 22, 1971, Ser. No. 117,714
Claims priority, application Japan, Feb. 25, 1970, 45/15,526
Int. Cl. B01j 11/22; C07c 11/22
U.S. Cl. 260—677 H                                 6 Claims

ABSTRACT OF THE DISCLOSURE

Catalyst for selective hydrogenation of acetylenic hydrocarbons in the concurrent presence of diolefins, which is composed of the carrier containing at least 5% by weight of magnesium-aluminum spinel of the formula, $$MgAl_2O_4$$

and, as the active metal component supported on the carrier, 1–50% by weight of copper component calculated as copper oxide, and 0.1–3% by weight of nickel component calculated as nickel oxide.

---

This invention relates to a novel selective hydrogenation catalyst of excellent heat stability. More particularly, the invention relates to the hydrogenation catalyst consisting of the carrier containing magnesium-aluminum spinel ($MgAl_2O_4$) and copper and nickel as active metal component supported on the carrier, which catalyst is highly effective for selective hydrogenation reaction of acetylenic hydrocarbons in the concurrent presence of diolefin, particularly in the vapor phase.

It is known that various catalysts composed chiefly of copper are normally useful for selective hydrogenation of acetylenic hydrocarbons in the concurrent presence of diolefins in the vapor phase, under atmospheric or elevated pressures. In that procedure, the catalyst is required to possess very high selectivity to hydrogenate predominantly the acetylenic hydrocarbons, because of the concurrent presence of the diolefins. Furthermore, the conventional practice is defective in that polymers are formed during the reaction, which tend to deposit on the catalyst layer to appreciably reduce the hydrogenation activity of the latter. Thus, the demand for novel catalyst of long-lasting activity and which is easily regenerated and has high heat stability has been very strong in the art.

We have engaged in concentrative studies with the view to improve the deteriorating tendency of hydrogenation activity, and the heat stability, of the catalyst, in the art of selective hydrogenation of acetylenic hydrocarbons in the concurrent presence of diolefins, and now succeeded to find a novel catalyst satisfying those requirements. When the catalyst of this invention is used in the selective hydrogenation reaction of acetylenic hydrocarbons in the concurrent presence of diolefins, the quantity of the polymer deposited on the catalyst during the reaction is markedly decreased, and the catalyst's hydrogenation activity of acetylenic hydrocarbons can be maintained at a satisfactorily high level for prolonged period. On the other hand, when the catalyst of lowered activity after use is exposed to high temperatures for a long time for regeneration purpose, detrimental effect of the sintering on the catalyst is only negligible. Thus the catalyst is found to possess very high heat stability, and can be easily regenerated with industrial scale apparatus.

The catalyst in accordance with the invention is composed of the carrier containing, as the chief component, i.e., at least 5% by weight, of magnesium-aluminum spinel ($MgAl_2O_4$), and as the active metal component supported on the carrier, 1–50% by weight of copper component as copper oxide (CuO), and 0.1–3% by weight of nickel component as nickel oxide (NiO).

Preparation of the subject catalyst will be explained in full details hereinbelow.

In the subject catalyst, it is particularly important to use the carrier containing at least 5 wt. percent of magnesium-aluminum spinel. As the carrier, magnesium-aluminum spinel alone may be used, or a combination of the spinel with other known carriers, such as alumina, calcined silica gel, mixture of diatomaceous earth with alumina, etc. may be employed. The optimum carrier for the invention has the chemical composition in which the mol ratio of MgO to $Al_2O_3$ ranges from 1:1 to 1:7. Generally speaking, it is considered that in the catalyst of the present invention almost all the magnesium component is in the form of spinel, and so it is most preferable that 20–80% of alumina should form spinel. The carrier may contain a minor amount of residual magnesium oxide without any detrimental effect.

When magnesium-aluminum spinel content of the carrier is less than 5 wt. percent, it is difficult to improve heat stability of the catalyst to any satisfactory level.

Magnesium-aluminum spinel can be prepared by the means known per se, such as:

(a) wet process (J. W. Mellor, A Comprehensive Treatise on Inorganic and Theoretical Chemistry, 5, 294 (1929)) and
(b) dry process (G. Huttig et al., Z. Electrochem., 40, 306 (1934)).

For the preparation of magnesium-aluminum spinel by the wet mixing method, equimolar quantities of water-soluble salts of magnesium and aluminum are mixed in sufficient quantity of aqueous ammonium chloride solution. Upon addition of aqueous ammonia to the system, hydroxides of aluminum and magnesium precipitate. The precipitate is the spinel of hydrates, which is then calcined at high temperature of no lower than 700° C., to be converted to the magnesium-aluminum spinel useful as the carrier.

The spinel can also be formed by dry mixing method, in which equimolar quantities of alumina or alumina gel and magnesium oxide are mixed and calcined at high temperatures not lower than 700° C.

According to the invention, the magnesium-aluminum spinel prepared by known means as above may be used as the carrier as it is, or may be mixed with other known carriers such as active alumina, alumina gel, silica gel, mixture of alumina with calcined silica gel (diatomaceous earth), etc. Or, carriers of optional magnesium-aluminum spinel content can be prepared through the above-described wet or dry processes, by varying the ratio by magnesium component to aluminum component. For example, in the dry process, within the range in which alumina is no more than 71.6 wt. percent, mixtures of magnesium oxide with magnesium-aluminum spinel can be obtained. Whereas, when the amount of alumina is more than 71.6 wt. percent, mixtures of magnesium-aluminum spinel with alumina can be obtained.

Preferably the magnesium oxide employed for the preparation of magnesium-aluminum spinel by the dry process is that obtained by calcining magnesium hydroxide, carbonate, or nitrate, at temperatures not higher than 800° C., to facilitate the spinel formation. It is also permissible to use magnesium hydroxide in place of magnesium oxide.

As the alumina, on the other hand, those referred to as crystalline or active alumina, e.g., anhydrous alumina such as  ρ-, χ-, η-, γ-, θ-, κ-alumina, or aluminum hydrate such as gibbsite, bayerite, boehmite, boehmite gel, etc., can be used. The optimum carriers for the catalyst of this invention contain at least 1 mole (71.6 wt. percent) of $Al_2O_3$ component per mol of MgO component in the carrier. The carriers may contain 10–90 wt. percent to the $Al_2O_3$ component of diatomaceous earth and/or silica gel calcined at 500° C. or above, to further improve the catalytic activity. Obviously, the carriers of the invention can contain a conventional caking agent such as alumina cement.

A still more important feature of the subject catalyst is to let the carrier support active metal components comprising 1–50, particularly 1–30, wt. percent of copper component as copper oxide, and 0.1–3 wt. percent of nickel component as nickel oxide. Such combination of active metal components brings about the desirable combination of selective hydrogenation activity for acetylenic hydrocarbons, and excellent heat stability and durability, of the catalyst of this invention, working concurrently with the employment of magnesium-aluminum spinel-containing carrier.

When the quantity of nickel component is less than 0.1 wt. percent as nickel oxide, the catalytic activity is low, and if it is more than 3 wt. percent, the catalyst's selectivity to the hydrogenation of acetylenic hydrocarbon is reduced. Also when the content of copper component is less than 1 wt. percent as copper oxide, the intended effect of the invention is not achieved, and if it is increased over 50 wt. percent, no correspondingly better result can be expected to justify the increase in cost. It is preferred to use a lesser amount of the nickel component than that of copper component, for example, approximately one-tenth in weight.

Supporting of the active metal components on the carrier can be achieved by the means known per se. That is, the magnesium-aluminum spinel-containing carrier or a premixture of the carrier is impregnated with the active metal components in the form of water-soluble compounds which can form oxides at calcining temperatures, for example, organic acid salts such as the formate, acetate, etc., or nitrate, sulfate or carbonate. If a premixture for forming the carrier, e.g., mixture of magnesium oxide with alumina, is used in that procedure, during the calcination of the system at 700° C. or above, magnesium-aluminum spinel is predominantly formed to show the excellent effect intended by the invention.

Hereinafter the manner of preparation of the subject catalyst will be more concretely described.

When the hydrogenation catalyst of the invention is to be prepared by the impregnation method, the carrier formed by mixing magnesium oxide with a predetermined amount of alumina or alumina-diatomaceous earth mixture, is mixed with, if necessary, a minor amount of at least one caking agent such as alumina cement, kaolin, bentonite, etc., and shaped by known means. The carrier is then impregnated with an aqueous solution of an active metal salt, for example, organic acid salt, nitrate, or carbonate, of a predetermined concentration, dried, and calcined at temperatures not higher than 800° C., in air, for 1 to 20 hours.

The catalyst can also be prepared by a precipitation process as follows: an active metal salt, for example, sulfate, as an aqueous solution, is co-precipitated with aqueous ammonia or an aqueous caustic soda solution, in the concurrent presence of diatomaceous earth as a carrier component, and washed with water. The remaining pasty substance is mixed with the rest of the carrier components (mixture of alumina and magnesium oxide as it is, or after calcination at 700° C. or above), dried, and if necessary, further mixed well with a caking agent such as alumina cement, followed by shaping by the means known per se. The mixture is then calcined at temperatures not higher than 800° C. in air for 1–20 hours to be converted to the catalyst.

In an embodiment of milling process, the above-described carrier containing magnesium-aluminum spinel is mixed with an aqueous solution of active metal salt, for example, nitrate, and milled well. Further, if necessary, a minor amount of alumina hydrogel, alumina cement, etc. is added as the caking agent, and the mixture is shaped by the means known per se, followed by calcining at temperatures not higher than 800° C. to provide the catalyst.

The catalyst can be used in the selective hydrogenation of acetylenic hydrocarbons in the concurrent presence of diolefins, in the manner similar to the use of known catalysts for vapor phase reaction.

The catalyst must be reduced prior to the use in the reaction, with hydrogen-containing gas at temperatures ranging from 250 to 450° C.

The hydrogenation reaction conditions are normally dependent on the acetylenic hydrocarbon concentration in the starting gas. Normally 1.5–5 molar times the acetylenic hydrocarbon of hydrogen is required. The suitable reaction temperature ranges from 100° to 250° C., and the reaction pressure, from atmospheric to 5 kg./cm.$^2$G. Also a space velocity of the gas of 100 to 500 [starting gas (liter)/catalyst (liter)/hr., NTP conversion] is employed.

The performance of a hydrogenation catalyst in the hydrogenation of acetylenic hydrocarbons in the concurrent presence of diolefins must be evaluated by: (a) its hydrogenation activity and durability thereof, (b) selectivity for acetylenic hydrocarbon hydrogenation, and (c) is susceptibility to sintering under high temperatures and heat stability in the process of regeneration. While many catalysts have been proposed for hydrogenation of acetylenic hydrocarbons in the presence of diolefins, none of them is fully satisfactory in all of the above three features.

For example, it has been proposed to contact the catalyst composed of copper as the chief component, and at least one other metal selected from nickel, cadmium, silver, iron, and vanadium, oxides of such metals being reduced to the corresponding metal by hydrogen at temperatures not higher than 550° C., which are dispersed and supported on inert porous material (for example, alumino-silicate, brick, porcelain, pumice, or porous silica, etc.), with the starting gas added with minor amount of hydrogen, at temperatures not higher than 300° C. (U.S. Pat. No. 2,426,604).

However, the proposed catalyst exhibits only low activity level at low temperatures, and short durability of the activity. Consequently the catalyst must be frequently regenerated, and is industrially unsatisfactory.

It has also been proposed to use the catalyst formed by finely dispersing active metal component containing copper which is activated by at least one metal selected from iron, nickel, ruthenium, rhodium, palladium, iridium and platina, on active alumina of large surface area (BET surface area: 25–300 m.$^2$/g.) (British Pat. No. 912,444). However, the copper-nickel-alumina catalyst based on this Dow Chemical's patent has the deficiency in that, when it is exposed to high temperatures in regeneration treatment, particularly the active metals, copper and nickel, readily form inert compounds with the carrier alumina with relative ease by solid phase reaction, consequently lowering the catalyst's activity for hydrogenating acetylenic hydrocarbons. This is clearly demonstrated as to the control catalyst in later given Example 1.

It has also been proposed to use palladium-copper-chromium-alumina catalyst system (Japanese Official Patent Gazette, Publication No. 12,883/1965) and also of copper-chromium catalyst system (Japanese Official Patent Gazette, Publication No. 22249/65). But both of those catalysts show poor selectivity, and their regenerative procedures are generally difficult.

The use of a catalyst composed of copper and at least one another active metal component selected from the metals of the Groups I and II of periodic table, as supported on a carrier such as silica gel, pumice, kaolin, alumina, etc. has also been disclosed (German Pat. No. 1,190,454).

However, the catalyst has only low catalytic activity and poor selectivity for hydrogenation of acetylenic hydrocarbons, as demonstrated by the control catalyst D in later given Example 1.

Thus, none of these known catalysts is fully satisfactory in the combined aspects of hydrogenation activity and durability thereof, selectivity for hydrogenation of acetylenic hydrocarbons, and heat stability in the regeneration treatment of the catalyst.

The subject invention provides the catalyst of excellent properties in all of above aspects in combination, by causing the carrier containing at least 5 wt. percent of magnesium-aluminum spinel ($MgAl_2O_4$) to support, as the active metal components, 1–50 wt. percent of copper component as copper oxide, and 0.1–3 wt. percent of nickel component as nickel oxide. The reason of such favorable results is, according to our opinion, as follows:

When a conventional copper-nickel-alumina catalyst is calcined at high temperatures (above 600° C.), sintering occurs to reduce the catalyst's BET surface area. Simultaneously, the respective bondage between the active metals, i.e., copper and nickel, and the carrier alumina, is strengthened through a solid phase reaction, and the compounds normally referred to as copper aluminate and nickel aluminate are formed.

Thus a heat-treated catalyst is found to exhibit very low activity in hydrogenation of acetylenic hydrocarbons, in a manner similar to the separately prepared mixed catalyst composed of copper aluminate and nickel aluminate.

In contrast thereto, the catalyst of the present invention, i.e., that formed of the carrier containing at least 5 wt. percent of magnesium-aluminum spinel and copper and nickel supported thereon, shows little reduction in BET surface area, even when calcined at high temperatures (800° C. or above). Furthermore, the solid phase reaction between the active metals, i.e., copper and nickel, and the carrier component is markedly inhibited, and substantially none of those compounds which are presumed to be copper aluminate and nickel aluminate are formed, but local formation of solid solutions of copper and nickel in magnesium oxide is observed. Thus the catalyst is found to possess very high heat stability, showing no deterioration in the activity for hydrogenation of acetylenic hydrocarbons.

The invention will be hereinafter explained with reference to the working examples.

EXAMPLE 1

The catalysts composed of copper and nickel supported on the carrier chiefly of magnesium-aluminum spinel in accordance with the invention and, as controls, copper-nickel catalysts supported on alumina were prepared as follows.

844 grams of copper acetate and 8.2 g. of nickel acetate were added to 2 liters of water, and to which concentrated aqueous ammonia was added at room temperature under thorough stirring. With the addition precipitates were formed, which were ultimately completely dissolved as the addition of concentrated aqueous ammonia was continued. The formed solution was divided into halves, to be used as the immersion liquid of the carriers described below.

As the carrier based on the subject invention, 680 g. (as $Al_2O_3$) of commercial active alumina (BET surface area: 200 m.²/g.) were mixed with 271 g. of magnesia obtained by calcining magnesium hydroxide in air at 500° C. for 4 hours. The mixture was calcined at 800° C. for an hour to form magnesium-aluminum spinel. This carrier was well impregnated with the foregoing immersion liquid at room temperature, dried at 150° C., and compression molded into tablets of 3 mm. in diameter and 2 mm. in length. The tablets were calcined in air at temperatures between 500° C. and 700° C. for 8 hours. This catalyst was labeled A-1.

Composition (as prepared): CuO(15 wt. percent)–NiO(0.15 wt. percent)–$Al_2O_3$(60.8 wt. percent)–MgO (24.2 wt. percent).

Spinel content of the carrier[1]: Approx. 80%.

Separately, as another preparation example of the carrier based on this invention, 680 g. of active alumina (as $Al_2O_3$) were mixed with 271 g. of magnesia similarly to the case of A-1 catalyst. The mixture was similarly impregnated with the aqueous copper-nickel solution, followed by molding and calcining (750° C. ×4 hrs.) similarly to those given to A-1 catalyst. The obtained catalyst was labeled B-1.

Spinel content of the carrier: Approx. 50%.

Then, as the control, a copper-nickel catalyst supported on alumina was prepared as follows, in accordance with Example 1 of Dow Chemical's British Pat. No. 912,444.

To 480 g. of copper acetate and 1.5 g. of nickel acetate, a sufficient amount of ammonia was added to form a liter of a solution. 951 grams of $\gamma$-alumina (BET surface area: 200 m²./g., 8-meshes in size) were thoroughly impregnated with the above-described ammoniac copper-nickel aqueous solution, dried at 200° C. for 5 hours, calcined in air at 350° C. for 10 hours, cooled, and compression molded by means known per se, into tablets of 3 mm. in diameter and 2 mm. in length. This catalyst was labeled C-1.

Catalyst composition:

CuO(16.7 wt. percent)–NiO(0.05 wt. percent)–$Al_2O_3$(83.2 wt. percent)

Separately, although entirely different from the catalyst according to the invention, the copper-containing catalyst on the carrier as specified in the aforesaid Chemische Werke Huels patent (German Pat. No. 1,190,454) which has a magnesium compound added was prepared as follows, as another control. Following the disclosures in the examples of the German patent, pumice was impregnated with aqueous copper carbonate (CuO, 14.9%) and magnesium carbonate (MgO, 2%) solutions, completely dried at 120° C., compression molded into tablets of 3 mm. in diameter and 2 mm. in length, and calcined at 500° C. for 4 hours. This catalyst is labeled D.

The A-1 and B-1 catalysts in accordance with this invention were used in selective hydrogenation reaction of acetylenic hydrocarbons, using the $C_4$ fractions of distillate specified in Table 1. When the hydrogenation activity of the catalyst was lowered, air and steam were sent into the system to regenerate the catalyst. The reaction temperature was so controlled that it should never exceed 700° C. Further the catalysts were reduced with hydrogen through the later specified procedure, and again used in the hydrogenation reaction of acetylenic hydrocarbons using the $C_4$ fractions of distillate. This reaction-regeneration-reduction-with-hydrogen cycle was repeated 50 times to examine the heat stability of each catalyst.

The catalysts subjected to the above heat stability test were labeled, respectively, A-2 and B-2.

Also the control catalyst, C-1, was treated similarly. At the tenth cycle of the reaction-regeneration-reduction-with-hydrogen, the catalytic activity dropped abruptly. That catalyst was labeled C-2.

Separately, for quick evaluation of heat stability, A-1, B-1, and C-1 catalysts were calcined in air at such extremely severe conditions as 900° C. for 4 hours. The resultant catalysts were labeled, respectively, A-3, B-3 and C-3.

Those 9 types of catalysts were used for the hydrogenation of acetylenic hydrocarbons in an identical reaction vessel and under substantially the same reaction conditions, to examine their activity.

---

[1] The spinel content was calculated from soluble magnesia content of the carrier.

The catalyst D was reduced at 200° C. with electrolytic hydrogen, and used in the reaction in the same reactor as employed in the foregoing tests.

The reduction with hydrogen was performed as follows:
One-hundred-and-fifty (150) cc. of a catalyst were introduced into a stainless steel tubular reactor of 30 mm. in inner diameter and 600 mm. in length, and reduced in advance of the hydrogenation reaction with electrolytic hydrogen and steam supplied at the respective rate of 15 liters/hr. and 45 liters/hr., at 350° C. for 10 hours.

The $C_4$ fractions of distillate employed in the reaction were those obtained by thermal cracking of straight-run gasoline, having the composition as shown in Table 1. As the impurities, sulfur compounds, were contained in the order of 0.01 wt. percent as methylmercaptan.

The reaction conditions were as follows: under a pressure of 1 kg./cm.$^2$ G., the $C_4$ starting material was mixed with 1.5–2.5 molar times the acetylenic hydrocarbon of hydrogen. The space velocity of the gas [starting gas (liter)/catalyst (liter)/hr.] was 300 (NTP conversion). The reaction started at 120–130° C., and as soon as the residual acetylenic hydrocarbon content of the gas at the exit became 50 p.p.m. or above, the reaction temperature was raised by 10 to 30° C., until the temperature reached 200° C.

The evaluation of catalytic activity was based on the activity for hydrogenation of acetylenic hydrocarbons determined by the remaining amount of acetylenic hydrocarbons in the exhaust gas, and the amount of residual hydrogen was used as the norm of selectivity. Also the durability of catalytic activity is expressed by the time duration during which the unreacted acetylenic hydrocarbon concentration in the gas at the exit was kept no higher than 50 p.p.m.

TABLE 1.—COMPOSITION OF $C_4$ FRACTION OF DISTILLATE

| Component: | Composition of starting material (mol percent) |
|---|---|
| Propane | 0.2 |
| Propylene | 1.5 |
| n-Butane | 7.0 |
| i-Butane | 1.6 |
| Butenes | 52.4 |
| 1,3-butadiene | 36.4 |
| 1,2-butadiene | 0.2 |
| Pentane fraction of distillate | 0.1 |
| Acetylenes | 0.6 |

The results of activity test given to the catalysts of this invention and the control catalysts as shown in Table 2.

Both of the catalysts in accordance with the invention, i.e., A–1 and B–1, exhibited high activity for hydrogenation of acetylenic hydrocarbons at low temperatures. The residual acetylenic hydrocarbon content in the gas at the exit was in all cases not more than 10 p.p.m., at 50 hours after initiation of the reaction. Also the residual hydrogen in the gas at the exit ranged 0.2–0.3 mol. percent. The catalysts could be used under the same reaction conditions for 130 hours or even longer, continuously.

Again the hydrogenation activity of A–2 and B–2 catalysts which had gone through the cycle of the reaction-regeneration-reduction-with-hydrogen 50 times was substantially the same to that of the new, untreated catalysts, thus showing excellent heat stability. Again the activities of A–3 and B–3 catalysts which were calcined at 900° C. for 4 hours in air for quick evaluation of heat stability were only slightly lowered at low temperatures. But at the reaction temperature of 150° C., the unreacted acetylenic hydrocarbon content of the gas at the exit was as low as 15 p.p.m., while the hydrogen content of the gas increased to 5.0 mol. percent, indicating an improved selectivity. The activity duration of those catalyst under such reaction temperature was at least 120 hours.

In clear contrast thereto, the C–1 catalyst used as a control was satisfactorily effective when new, but as the cycle of reaction-regeneration-reaction-with-hydrogen was repeated, its activity was increasingly lowered. Thus the C–2 catalyst could not reduce the untreated acetylenic hydrocarbon content of the gas at the exit to below 100 p.p.m., even at such high reaction temperature as 200° C. the C–3 catalyst also showed equally negligible catalytic activity.

The catalyst D containing no nickel had only very low catalytic activity for hydrogenation of acetylenic hydrocarbons, even at the reaction temperatures raised from 130° C. to 200° C.

EXAMPLE 2

A catalyst of the present invention composed of copper and nickel on the carrier mainly of magnesium-aluminum spinel and which also contains diatomaceous earth was prepared as follows.

A solution was formed by dissolving 628 g. of copper sulfate and 15.1 g. of nickel sulfate in 10 liters of water, and maintained at 60–70° C. To the solution 7.8 liters of 1 N aqueous caustic soda was gradually added under stirring, and the formed precipitate was filtered, and washed three times with water. Separately, 726 g. of a powdery, homogeneous mixture composed of 44 wt. percent of γ-alumina (obtained by calcining boehmite at 500° C.), 18.8 wt. percent of magnesia (obtained by cal- TABLE 2.—RESULTS OF EVALUATION OF HYDROGENATION ACTIVITY OF THE CATALYSTS OF THIS INVENTION AND CONTROL CATALYSTS

| Catalyst label | Reaction temperature (° C.) | Residual H$_2$ in gas at exit (mol percent) | Acetylenic hydrocarbon content of gas at exit (p.p.m.) | Duration of catalyst's hydrogenation activity (hrs.) | Treatments given to catalyst |
|---|---|---|---|---|---|
| Catalysts of this invention: | | | | | |
| A–1 | 130 | 0.3 | ≤10 | 130 | None. |
| A–2 | 130 | 0.5 | 20 | 125 | Regenerated 50 times. |
|  | 140 | 0.4 | 12 | 125 | Do. |
| A–3 | 130 | 0.7 | 25 | 125 | Calcined at 900° C. for 4 hrs. |
|  | 150 | 0.5 | 12 | 125 | Do. |
| B–1 | 120 | 0.2³ | 10 | 175 | None. |
| B–2 | 130 | 0.5 | 20 | 130 | Regenerated 50 times. |
|  | 140 | 0.3 | 10 | 130 | Do. |
| B–3 | 130 | 0.6 | 25 | 120 | Calcined at 900° C. for 4 hrs. |
|  | 150 | 0.5 | 15 | 120 | Do. |
| Control: | | | | | |
| C–1 | 130 | 0.1⁵ | 10 | 75 | None. |
|  | 150 | 0.0⁵ | 10–30 | 95 | Do. |
|  | 170 | Trace | 30–100 | 100 | Do. |
| C–2 | 150 | 0.75 | 1,500 | | Regenerated 10 times. |
|  | 200 | 0.2⁹ | 500 | | Do. |
| C–3 | 150 | 1.0 | 4,000 | | Calcined at 900° C. for 4 hrs. |
|  | 200 | 0.8⁵ | 3,500 | | Do. |
| D | 130 | 1.0 | 1,500 | | None. |
|  | 140 | 0.8 | 1,000 | | Do. |
|  | 170 | 0.5 | 400 | | Do. |
|  | 200 | 0.2 | 100 | | Do. | cining magnesium carbonate at 600° C. for 4 hours), and 37.2% wt. percent of diatomaceous earth was prepared as the carrier, which was well kneaded with the aforesaid precipitate.

The mixture was dried at 150° C., further mixed with 5 wt. percent to the dry mixture of alumina cement, and compression molded into tablets of 3 mm. in diameter and 2 mm. in length, by the accepted practice. The tablets were calcined in air at 700° C. for 4 hours. The prepared catalyst was labeled E.

Composition: CuO(19.1 wt. percent)–NiO(0.4 wt. percent)–carrier (75.6 wt. percent).

Spinel content of the carrier: 15%.

Catalyst F 628 grams of copper sulfate and 15.1 g. of nickel sulfate were dissolved in 10 liters of water, and maintained at 60–70° C. To the solution, 7.8 liters of 1 N aqueous caustic soda were gradually added under stirring, and the formed precipitate was filtered and washed three times with water. Separately, 796 g. of a powdery, homogeneous mixture composed of 50.3 wt. percent of diatomaceous earth, 43.4 wt. percent of γ-alumina, and 6.3 wt. percent of magnesia which was obtained by calcining magnesium carbonate at 600° C. for 4 hours in air was prepared as the carrier. The powder was thoroughly mixed with the aforesaid precipitate, dried at 100° C., and compression molded into tablets of 3 mm. in diameter and 2 mm. in length, by the accepted practice. In that occasion, 5 wt. percent to the mixture of graphite was added. Then the tablets were calcined in air at 700° C. for 4 hours. This catalyst was labeled F.

Composition: CuO(18.0 wt. percent)–NiO(0.39 wt. percent)–$Al_2O_3$(31.0 wt. percent)–MgO(4.5 wt. percent)–diatomaceous earth (36.0 wt. percent)–graphite (balance).

Spinel content of the carrier: 5 wt. percent.

TABLE 3.—COMPOSITION of $C_4$ FRACTIONS OF DISTILLATE

| Component: | Composition of starting material (mol percent) |
|---|---|
| Propylene and propane | 1.9 |
| n- and i-Butane | 6.7 |
| Isobutene | 18.8 |
| Butene-1 | 15.4 |
| Butene-2 | 7.0 |
| 1,3-butadiene | 48.0 |
| 1,2-butadiene | 0.3 |
| Vinylacetylene | 1.18 |
| Ethylacetylene | 0.12 |
| Methylacetylene | 0.60 |
| (Total of α-acetylenes, 1.90). | |
| Total | 100.00 |

The same reactor as employed in Example 1 was charged with 150 cc. of the catalyst E, which was then reduced at 400° C. for 8 hours with 90 mol percent $H_2$ (CO content: 0.1 mol percent; balance of methane) in advance of the reaction. The $C_4$ fractions of distillate had the composition as set forth in Table 3, which contained 0.01 wt. percent, as methylmercaptan, of sulfur compounds as the impurities. To the total α-acetylenes of the $C_4$-fractions of distillate, 1.5–2.5 molar times that of hydrogen (purity: 90 mol percent; CO content, 0.1 mol percent) was used in the reaction. The reaction pressure was 3 kg./cm.², reaction temperature, 130° C., and space velocity of the gas, 250 [starting gas (liter)/catalyst (liter)/hr. NTP conversion]. In the resulting system, the concentration of acetylenic hydrocarbon remaining unreacted in the gas at the exit was 50 p.p.m. or less, and the unreacted hydrogen, 0.1–0.7 mol percent. The catalytic activity sufficient to maintain the unreacted acetylenic hydrocarbon concentration at 50 p.p.m. or below lasted, in total, over 80 hours.

Then the catalyst of which gravity for hydrogenation of acetylenic hydrocarbon was reduced after use was calcined in air and steam, and fully regenerated. The regeneration condition was such that the temperature at the entrance of air was gradually raised to 550° C. The temperature of the catalyst layer under regeneration rose as high as 750° C. The regenerated catalyst was again used in the reaction under the conditions identical with the previously described preliminary reduction conditions, and its hydrogenation activity for acetylenic hydrocarbons was examined.

As the result, the regenerated catalyst exhibited the performance of substantially the same level with that of the catalyst E as newly prepared.

Separately, in order to evaluate the catalyst's heat stability under exposure to high temperatures, the catalyst E was calcined in air, at 900° C. for 4 hours. The calcined catalyst was subjected to the preliminary reduction and used in the reaction, both under the same conditions as described above, except that the reaction temperature was raised to 140° C. The catalyst exhibited quite satisfactory result.

Also the activity of catalyst F in hydrogenation of acetylenic hydrocarbon was examined after the identical preliminary reduction with that given to catalyst E, in the reaction identical with the above-described. The results were equally favorable with those obtained with catalyst E, i.e., in the resulting system, the concentration of acetylenic hydrocarbon remaining unreacted was never higher than 50 p.p.m., and that of unreacted hydrogen was 0.5–1.0 mol percent. The duration of the catalytic activity sufficient to keep the unreacted acetylenic hydrocarbon concentration below 50 p.p.m. was, in total, over 70 hours. Thus the catalyst's excellent heat stability was persuasively demonstrated, since it showed almost no abrupt drop in catalytic activity after repetitive heat treatments.

EXAMPLE 3

A copper-nickel catalyst on carrier in accordance with the invention was prepared as follows.

371 grams of copper nitrate and 19.5 g. of nickel nitrate were dissolved in 4 liters of water. Separately, as the carrier component, 500 g. of γ-alumina obtained by calcining boehmite at 500° C., 290 g. of magnesium hydroxide, and 19.5 g. of diatomaceous earth, were mixed thoroughly, and calcined in air at 800° C. for 4 hours. This carrier was impregnated with the above copper-nickel aqueous solution, and completely dried at 120° C. Then 5 wt. percent to the dry mixture of alumina cement was added, and the mixture was compression molded into tablets of 3 mm. in diameter and 2 mm. in length, by known means. The tablets were calcined at 650–750° C. under continuous air supply for 10 hours, until the discharge of nitrate radical was no longer observed.

This catalyst was labeled G.

Composition: CuO(9.5 wt. percent)–NiO(0.48 wt. percent)–$Al_2O_3$(47.5 wt. percent)–MgO(19.0 wt. percent)–$SiO_2$(18.5 wt. percent)–alumina cement(balance).

Spinel content of the carrier: 60%.

The same reactor as employed in Example 1 was charged with 150 cc. of catalyst G, which were preliminarily reduced in hydrogen current at 400° C. for 8 hours. As the starting $C_4$ fractions of distillate, that of the composition as shown in Table 1 was used, at the reaction temperature of 130° C., reaction pressure of 2 kg./cm.² G, the space velocity of gas [starting gas (liter)/catalyst (liter)/hr.] of 250, and the molar ratio between hydrogen and acetylenic hydrocarbon of 2.

The catalyst G in accordance with the invention had a very high activity level at low temperatures. At fiftieth hour after initiation of the reaction, the concentration of acetylenic hydrocarbon remaining unreacted in the gas at the exit was not higher than 10 p.p.m., and the unreacted hydrogen was 0.6 mol percent. When the catalyst was used continually for 200 hours under the aforesaid reaction condition, still no appreciable tendency of reduction in its hydrogenation activity was observed.

EXAMPLE 4

The C₅ fractions of distillate obtained by thermal cracking of the more volatile naphtha fraction of distillate, of the following composition was used as the starting material.

TABLE 4.—COMPOSITION OF C₅ FRACTIONS OF DISTILLATE

| Component: | Composition of starting material (mol percent) |
|---|---|
| n-Pentane | 17.0 |
| Cyclopentadiene | 1.5 |
| Isoprene | 15.1 |
| Trans-piperylene | 6.0 |
| Cis-piperylene | 3.5 |
| Cyclopentene | 3.4 |
| Isopentene-1 | 38.25 |
| Pentene-2 | 10.1 |
| Valylene | 0.16 |
| Pentyne-1 | 0.03 |
| Butyne-2 | 0.41 |
| Pentyne-2 | 0.05 |
| Total α-acetylenes | 0.19 |
| Others | 4.5 |

The catalyst G prepared in the manner described in Example 3 was preliminarily reduced with hydrogen at 400° C., and then used in the hydrogenation reaction at 130° C. and 2 kg./cm.²G, the space velocity of gas [volume of gas (liter)/catalyst's volume (liter)/hr., NTP conversion) of 250, and the mol ratio of hydrogen to acetylenic hydrocarbon (α) of 2.5–5. The concentration of C₅ acetylenic hydrocarbon remaining unreacted in the gas was not higher than 30 p.p.m., and that of the unreacted hydrogen, 0.1–0.2 mol percent. The hydrogenation activity of the catalyst lasted for over 30 hours.

We claim:
1. A catalyst for the selective gas phase hydrogenation of acetylenic hydrocarbons in the concurrent presence of diolefins, which comprises a carrier containing at least 5% by weight of magnesium-aluminum spinel of the formula,

$$MgAl_2O_4$$

and, as the active metal component supported on said carrier, 1–50% by weight of an oxide of copper calculated as CuO and 0.1–3% by weight of an oxide of nickel calculated as NiO.

2. The catalyst of claim 1, wherein said carrier is prepared by mixing alumina or alumina gel with magnesium oxide or magnesium hydroxide in such quantitative ratios that the molar ratio of MgO to Al₂O₃ is within the range of 1:1 to 1:7, and calcining the mixture at a temperature not lower than 700° C.

3. The catalyst of claim 1, wherein said carrier is prepared by mixing a solution of a water-soluble salt of magnesium with a solution of water-soluble salt of aluminum, in such quantitative ratios that the molar ratio of MgO to Al₂O₃ is within the range of 1:1 to 1:7, adding aqueous ammonia to the mixed solution, and calcining the resulting coprecipitate of aluminum hydroxide and magnesium hydroxide at a temperature not lower than 700° C.

4. The catalyst of claim 1, wherein said carrier is prepared by calcining a premixture of
(i) alumina or alumina gel,
(ii) magnesium oxide or hydroxide, and
(iii) a member of the group consisting of diatomaceous earth and silica gel which has been calcined at temperatures not lower than 500° C.
at a temperature not lower than 700° C., the molar ratio of MgO to Al₂O₃ in the carrier ranging from 1:1 to 1:7, and the quantitative ratio of component (iii) being 10 to 90% by weight based on the weight of the Al₂O₃ component.

5. In a process which comprises contacting a C₄ distillate containing diolefins and acetylenic hydrocarbons, together with 1.5 to 5 molar times the acetylenic hydrocarbon of hydrogen, with a hydrogenation catalyst at a temperature ranging from 100 to 150° C. and at a pressure ranging from atmospheric to 5 kg./cm.² gauge, thereby selectively hydrogenating the acetylenic hydrocarbon, the improvement wherein said hydrogenation catalyst comprises the reduction product of a carrier containing at least 5% by weight of magnesium-aluminum spinel of the formula, $$MgAl_2O_4$$

and, as the hydrogenation catalytic metal component supported on said carrier, 1–50% by weight of an oxide of copper calculated as CuO, and 0.1–3% by weight of an oxide of nickel calculated as NiO.

6. A catalyst for the selective gas phase hydrogenation of acetylenic hydrocarbons in the concurrent presence of diolefins, which comprises the reduction product of a carrier containing at least 5% by weight of magnesium-aluminum spinel of the formula, $$MgAl_2O_4$$

and, as the active metal component supported on said carrier, 1–50% by weight of an oxide of copper calculated as CuO and 0.1–3% by weight of an oxide of nickel calculated as NiO.

References Cited
UNITED STATES PATENTS
3,076,858    2/1963    Freviel _____ 260—677
3,459,657    8/1969    Krönig _____ 208—143

DANIEL E. WYMAN, Primary Examiner
W. J. SHINE, Assistant Examiner

U.S. Cl. X.R.
252—463, 466 J